US009129254B2

(12) United States Patent
Lind et al.

(10) Patent No.: US 9,129,254 B2
(45) Date of Patent: Sep. 8, 2015

(54) CONCATENATING MESSAGES FROM MULTIPLE SOURCES IN A NOTIFICATION SYSTEM

(75) Inventors: Martin Lind, Los Angeles, CA (US); Deanna Ellis, Pasadena, CA (US)

(73) Assignee: BLACKBOARD CONNECT INC., Washington, DC (US)

( * ) Notice: Subject to any disclaimer, the term of this patent is extended or adjusted under 35 U.S.C. 154(b) by 548 days.

(21) Appl. No.: 12/346,749

(22) Filed: Dec. 30, 2008

(65) Prior Publication Data
US 2010/0169434 A1    Jul. 1, 2010

(51) Int. Cl.
*G06F 15/16* (2006.01)
*G06Q 10/10* (2012.01)

(52) U.S. Cl.
CPC ..................................... *G06Q 10/10* (2013.01)

(58) Field of Classification Search
CPC ..... H04L 12/587; H04L 12/581; H04L 67/26; H04L 51/24; H04L 21/38
USPC ................................................. 709/206, 203
See application file for complete search history.

(56) References Cited

U.S. PATENT DOCUMENTS

| | | | |
|---|---|---|---|
| 7,546,348 B2 * | 6/2009 | Wilson et al. | 709/206 |
| 7,571,474 B2 * | 8/2009 | Ross et al. | 726/22 |
| 7,609,820 B2 * | 10/2009 | Bedingfield, Sr. | 379/88.12 |
| 7,876,783 B2 * | 1/2011 | Kim | 370/473 |
| 8,015,152 B2 * | 9/2011 | Ozhan et al. | 707/613 |
| 2003/0154254 A1 * | 8/2003 | Awasthi | 709/206 |
| 2004/0002972 A1 * | 1/2004 | Pather et al. | 707/6 |
| 2006/0274701 A1 * | 12/2006 | Albertsson | 370/338 |
| 2007/0100959 A1 * | 5/2007 | Eichstaedt et al. | 709/217 |
| 2007/0197195 A1 * | 8/2007 | Sugiyama et al. | 455/412.2 |
| 2009/0138562 A1 * | 5/2009 | Schmulen et al. | 709/206 |
| 2009/0150498 A1 * | 6/2009 | Branda et al. | 709/206 |
| 2009/0182827 A1 * | 7/2009 | Bouazizi | 709/206 |
| 2009/0187631 A1 * | 7/2009 | Su et al. | 709/206 |
| 2010/0113072 A1 * | 5/2010 | Gibson et al. | 455/466 |

* cited by examiner

*Primary Examiner* — Duyen Doan
(74) *Attorney, Agent, or Firm* — McDermott, Will & Emery LLP (57) ABSTRACT

A method for sending messages within notifications to a recipient is disclosed. The method includes receiving information related to at least one recipient and receiving a selection of at least two messages from a plurality of messages. The method also includes associating the at least one recipient with the at least two messages, and transmitting at least one notification to the at least one recipient, the at least one notification comprising the at least two messages. A system for sending messages within notifications to a recipient is also provided.

22 Claims, 6 Drawing Sheets

CONCATENATING MESSAGES FROM MULTIPLE SOURCES IN A NOTIFICATION SYSTEM

BACKGROUND

1. Field

The present disclosure relates to transmission of notifications, and more particularly, to methods and systems for concatenating notifications in a notification system.

2. Background

Businesses and governmental entities, including municipalities and schools, are ever more reliant on communicating through the mass transmission of notifications to their staff, citizens and family members of students to keep these constituencies apprized of important events, including emergencies and commerce. For example, a school principal might need to send a message to the parent of every student that the school will be immediately closed due to flooding, fire, or blizzard. Notifications with such messages might be sent by telephones, facsimiles, pagers, electronic mail (e-mail), and/or text messages. These notifications will typically vary in their degree of importance, in the number of recipients, and in the immediacy with which they must be received.

However, there currently exists a growing problem as mass notification transmission systems become more prevalent. In particular, the personnel responsible for the oversight (e.g., command and control) of various notifications typically do not know either what personnel within their own organization or personnel at other institutions and agencies may be communicating with the same message recipient, and with what information. In many such situations, messages about the same incident and to the same people are issued from different users and/or different sources. For example, a local police department might need to inform residents of a city that the next day's snowfall will require cars to be removed from the street for plowing. A fire department might need to inform residents of the city that the snowfall will be bringing extreme cold and that residents without heat in their homes should go to a shelter. Both messages may concern the same areas in the city. As another example, a ninth grade history teacher might need to inform a student's parents that a student was absent to history class, and a ninth grade art teacher might also need to inform the student's parents that the student was absent to art class.

In such situations, multiple notifications will be sent to the same recipient, often with the same or similar message in each notification. It would be desirable to deliver these messages in a uniform and efficient manner.

SUMMARY

There is a need for an appropriate notification system that associates messages from different sources and/or different user intended for a recipient and delivers them to the recipient in a uniform and efficient manner. Embodiments of the disclosed systems and methods address this and other needs.

The present disclosure describes systems and methods whereby messages from different users and/or different sources and intended for a single recipient may be jointly delivered to the recipient, who may use various different devices to receive the notification.

In certain aspects of the disclosure, a method for sending messages within notifications to a recipient is provided. The method includes receiving information related to at least one recipient and receiving a selection of at least two messages from a plurality of messages. The method also includes associating the at least one recipient with the at least two messages, and transmitting at least one notification to the at least one recipient, the at least one notification comprising the at least two messages.

In a further aspect of the disclosure, a system for sending messages within notifications to a recipient is provided. The system includes a recipient module configured to store information related to at least one recipient, and a messaging module configured to store a plurality of messages. The system also includes an association module configured to associate the at least one recipient with at least two messages from the plurality of messages, and a transmission module configured to transmit at least one notification to the at least one recipient, the at least one notification comprising the at least two messages.

In yet a further aspect of the disclosure, a machine-readable medium encoded with instructions for sending messages within notifications to a recipient is provided. The instructions include receiving information related to at least one recipient, and receiving a selection of at least two messages from a plurality of messages. The instructions also include associating the at least one recipient with the at least two messages, and transmitting at least one notification to the at least one recipient, the at least one notification comprising the at least two messages.

In another aspect of the disclosure, a system for sending messages within notifications to a recipient is provided. The system includes means for receiving information related to at least one recipient and means for receiving a selection of at least two messages from a plurality of messages. The system also includes means for associating the at least one recipient with the at least two messages and means for transmitting at least one notification to the at least one recipient, the at least one notification comprising the at least two messages.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

There is a problem in mass notification systems of a recipient being sent, from different users at the same source and/or different users from different sources, multiple messages in separate notifications relating to one or multiple events. This and other problems are addressed and solved, at least in part, by embodiments of the present disclosure which include a system for sending messages within a notification to a recipient. The system includes a recipient module configured to store information related to at least one recipient, and a messaging module configured to store a plurality of messages. The system also includes an association module configured to associate the at least one recipient with at least two messages from the plurality of messages, and a transmission module configured to transmit at least one notification to the at least one recipient, the at least one notification comprising the at least two messages.

With reference to the drawings, which are provided by way of exemplification and not limitation, there are disclosed embodiments for disseminating a mass of outgoing digital notifications to a selected group, or groups, of recipients by way of various communication methods. More specifically, the creation of individual notifications including one or many messages for a mass of recipients is disclosed. As discussed herein, a notification is an instance of communication that includes at least one message. As an example, a single notification might include one message: "please avoid Main Street." As another example, a single notification might include two messages: "please clear your brush before fire season," and "please contact your local fire department for further details." A notification is the communication itself, such as a phone call, a text message, an email, etc.

Figure 1:
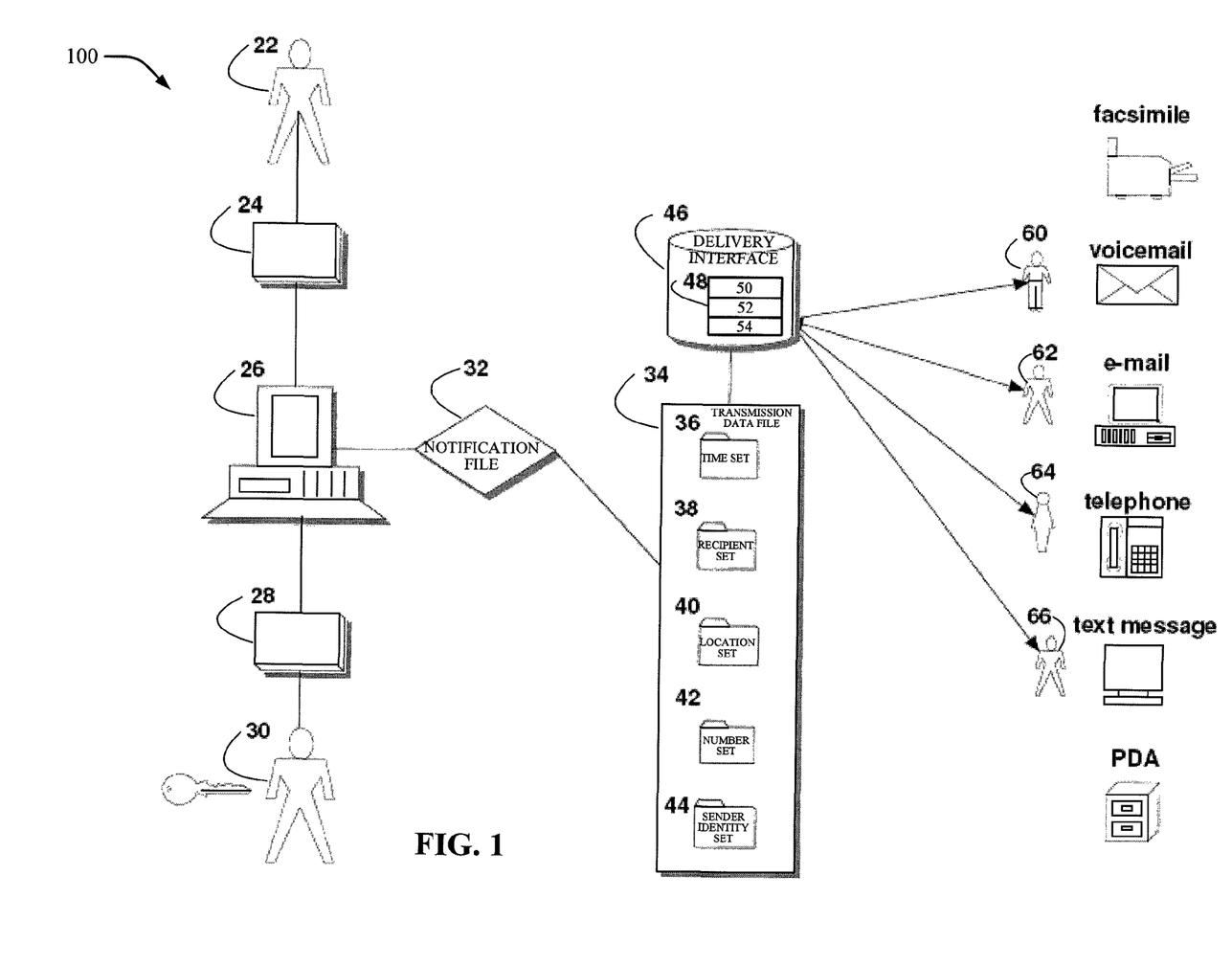
FIG. 1 is a diagram illustrating an example of a mass notification transmission system.

FIG. 1 is a diagram illustrating an example of a mass notification transmission system. For the following description, only one initiator of a notification is initially described in order to explain how a single notification is processed. However, the present disclosure will also describe the concatenation of messages from a single initiator or multiple initiators.

As can be seen in FIG. 1, a CPU or central processing unit 26 forms a core component of the system. The CPU 26 is preconfigured to receive a notification from a user 22 of the system who may wish to act as an initiator by sending that notification to a large number of recipients 60, 62, 64, and 66. The user 22 will have normally acquired the right to send a notification into the CPU 26 by earlier entering into a contract with the management of the system, entering his name on a list of legitimate users, paying the required fee if appropriate, and acquiring an entry code. The notification the user 22 sends to the CPU 26 may be sent in any one of a number of different formats via a transmission interface 24. It should be noted that a system administrator 30 may also send a notification via a different transmission interface 28. For example, the transmission interface 24 and/or 28 may be an ordinary land telephone, a radio transmitter, a cell phone, a computer for sending email, a computer with an internet connection, or it may be a facsimile machine for sending faxes, or the like.

Using the example discussed above, a message included in a notification might be: "Please clear your brush before fire season." The selected recipients might be a group of residents who live within a fire zone. The time and date to send might be a pre-set window between "4:00 PM" and "7:00 PM" and "tonight," respectively, and the methods of transmission to recipients selected by the user might include telephone and e-mail delivery. These choices are exemplary only.

Once the notification is received by the CPU 26 from the user 22, it is stored by the CPU 26 as a notification file 32 in a local or remote memory associated with the CPU 26. The notification file 32, that includes the message, may be associated with a transmission data file 34 for later use, as set forth more fully below. If the notification received is an ordinary voice notification via an interface 24 which is a telephone, the analogue voice signal may be converted to a digital sound file such as a .wav file and stored by the CPU 26 as such. If the notification received via the interface 24 is an email, it may be stored by the CPU 26 as a .txt file, but it may also be converted to a sound file using text-to-speech (TTS) software. If the notification is received as a facsimile, it may be stored by the CPU 26 as a .pdf file. Such file formats are exemplary only. All of these notifications are stored pending distribution to the appropriate recipients in the appropriate form.

Once the notification file 32 is stored by the CPU 26, it is associated with the transmission data file 34 that is structured to include one or more of a number of data sets 36-44 that will later assist in controlling the transmission of the notification file 32. For example, the user 22 may insert information into the data sets 36-44 by entering keystrokes (telephone key, computer key, cell phone pad key, etc.) in response to queries from the CPU as to what information should be entered in the data sets 36-44. The data sets 36-44 will then be associated with the notification file 32, as described.

The data sets 36-44 may comprise the following data sets. A time set 36 contains information relating to the time the notification is scheduled for distribution. A recipient set 38 contains information relating to the class of recipients the notification is intended to reach. For example, the recipients may be all the parents of students at a school between 6th and 8th grades. A location set 40 contains information relating to the geographical locations the notification is intended to reach. For example, the intended recipients may be all the residents in an area of town bounded by the river to the North, Main St. to the South, $3^{rd}$ Ave. to the East and Elm St. to the West, or a 5 mile stretch of homes next to a forest at risk of wildfires. Further data sets may be generated from information provided in preceding sets. For example, a number set 42 may be generated by the CPU 26 from the information entered into the recipient set 38, wherein the CPU 26 calculates the number of intended recipients of the notification, and enters that number into the number set 42 for later use.

A sender identity set 44 may contain the identity of the user 22 who created the notification, and information relating to the status and rights of that user 22. The status and rights of the user 22 would be obtained based on the code entered by the user 22 to access the CPU 26 in order to leave the notification. For example, the user identity set 44 may indicate that the user 22 is the principal of a school who would legitimately want to reach a large audience of parents of students at the school. Alternatively, the user identity set 44 may indicate that the user is a teacher of 8th grade, who would typically want to reach only the parents of students in her 8th grade class, or perhaps all the 8th grade students in the school, but whose legitimate interest would not include communicating with the parents of all the students at a school.

As noted above, the notification 32 may be created in a plurality of formats (e.g., .wav, .txt, or .pdf). For example, the notification 32 may be created in at least one format, based on whether the notification is received via interface 24 as a voice notification, an email or a facsimile. Once the notification 32 is created in the appropriate plurality of formats (e.g., .wav, .txt, or .pdf) and is associated with the transmission data file 34 with its data sets, the CPU 26 stores the notification and associated data file in a delivery interface 46. The delivery interface 46 is configured to hold the notification in storage 48 until a triggering event occurs, as more fully described below.

According to an embodiment of the disclosure, delivery interface 46 may include storage unit 48, which may store information including notification data 50, sender data 52, and recipient data 54. For example, in the context of school, storage unit 48 may be configured to include at least the following fields for each student: "Parent Name," "Student Name," "User 1," and "Message 1." With particular relevance to the present disclosure, notification data 50 may include a single message or multiple messages. To obtain information referred to by fields of transmission data file 34, delivery interface 46 may access the appropriate data from storage unit 48. For example, if recipient set 38 identifies the recipients as all parents of students at a school between 6th and 8th grades, the parent contact information for all 6th and 8th grade students can be accessed from storage unit 48. It should be noted that the storing of notification data 50, sender data 52 and recipient data 54 is not limited to storage unit 48, and that this data may be stored elsewhere in CPU 26 or in other external systems.

Within the delivery interface 46 in the CPU, each recipient of the notification 32 has already been associated with a form of transmission according to a prior request made by each potential recipient to the management of the system. Thus, for example, recipient 60 may have requested to be associated with a form of transmission by facsimile, recipient 62 may be associated with a form of transmission by voicemail, recipient 64 may be associated with a form of transmission by e-mail, recipient 66 may be associated with a means of transmission by text message, or pager, and so on. Thus, the CPU 26 is configured to transmit the notification 32 in appropriate format (e.g. .wav, .txt, .pdf) to each recipient, according to a known method. In certain embodiments, a means of transmission may be associated with the recipient based on a selection made by the user 22. For example, a user may choose to associate a recipient with voicemail if the notification 32 is urgent. In certain embodiments, a means of transmission may be automatically associated with the recipient based on the content of the notification 32. For example, if the notification 32 includes an image, then means of transmission may be facsimile, email or Multimedia Messaging Service (MMS).

When a triggering event occurs, the delivery interface 46 causes one or many notifications 32 (having been delivered to the computer system 26 by an enabled user 22 possessing an appropriate access code) to be distributed, according to known methods, to a mass of recipients, e.g. recipients 60-66 of FIG. 1, identified by the user 22. Such notifications 32 may be combined with numerous similar notifications (e.g., in a notification batch) for mass transmission at approximately the same time. This capability of the system places power in the hands of an institution or group of people to keep classes of citizens informed of events that are directly relevant to them as those events occur.

Considering further aspects of the disclosed systems and methods, an exemplary problem that may be encountered will now be described. A first notification batch may include, for example, five separate notifications, each containing one message, that would all be sent separately to each of the recipients in prior systems. Each of the five messages may be from the same source or from different sources. This is an undesirable situation, especially if the notifications are distributed via telephone, where in the example each recipient would receive five separate telephone calls, each call containing a single message. In a mass notification transmission system such as the one illustrated in FIG. 1, it may be desirable for multiple messages intended for a single recipient to be concatenated (e.g., combined or associated) into a single notification. Returning to the previous example, according to the present disclosure, each recipient would instead receive a single telephone call notification including all five messages. As another example, according to the present disclosure, a recipient can receive a single telephone call notification that includes two separate survey messages in which the recipient may respond to survey questions, such as questions that relate to updating the recipient's profile in separate electronic data systems, corresponding to the two survey messages, owned by a common company. Thus, an efficient method and system for concatenating messages into a single notification is provided.

Figure 2:
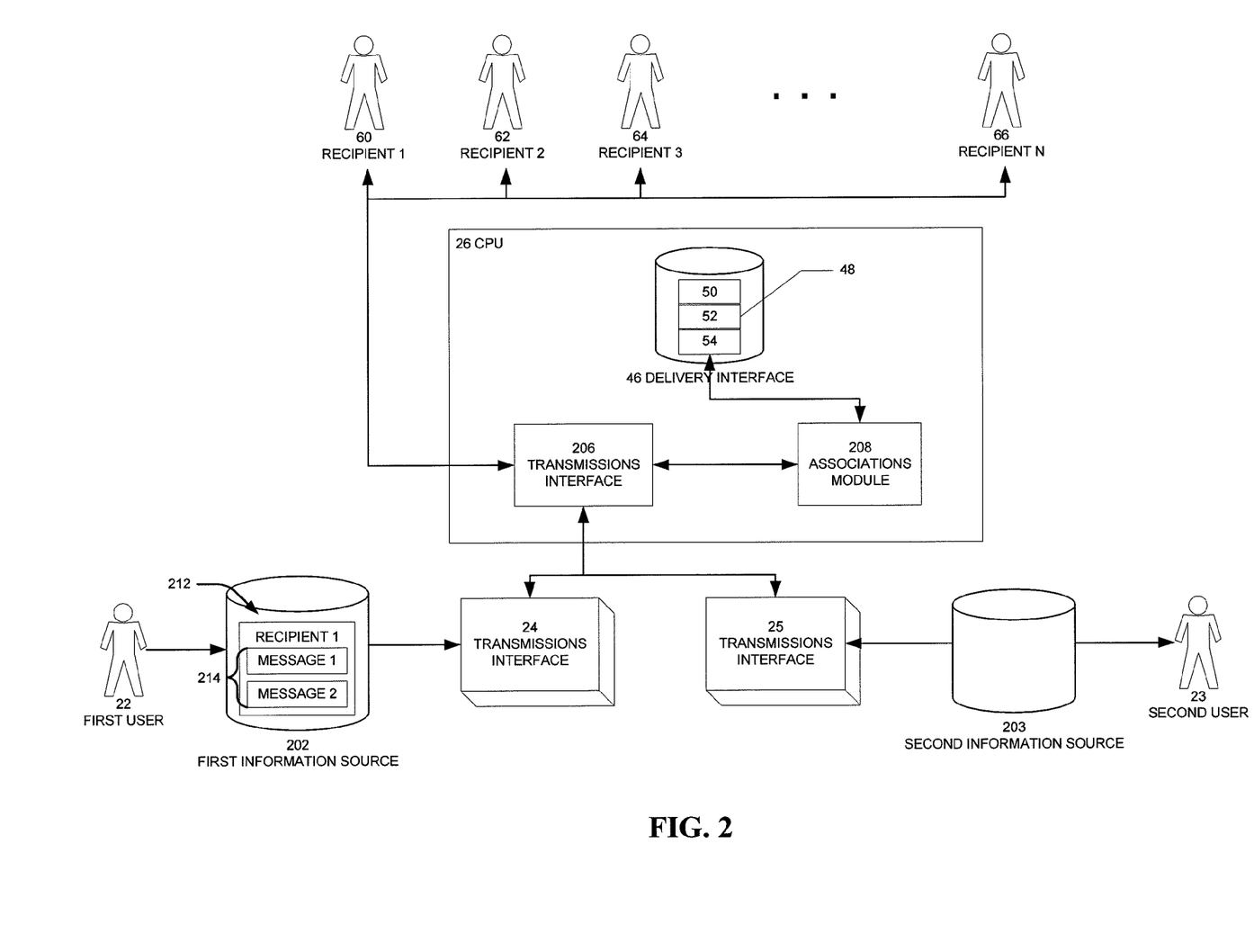
FIG. 2 is a diagram illustrating an embodiment of the mass notification transmission system of FIG. 1 for concatenating messages from multiple sources.

FIG. 2 is a diagram illustrating an embodiment of the mass notification transmission system of FIG. 1 for concatenating messages from multiple sources. A source may include, for example, multiple users, such that system is configured for concatenating messages from multiple users at the same source in addition to concatenating messages from users at different sources.

As can be seen in FIG. 2, CPU 26 includes a transmissions interface 206, an associations module 208, and the delivery interface 46. The system further includes a transmissions interface 25, a first information source 202 for the first user 22, and a second information source 203 for a second user 23.

The first information source 202 and the second information source 203 each store predetermined messages (e.g., "please clear your brush before fire season") that may be selected to be sent to a recipient. The first information source 202 and the second information source 203 can be edited to add or remove messages. The messages may be stored in any format, including audio and text formats. The first information source 202 and the second information source 203 may be any software or hardware structure used for the collection of data, such as, for example, a database.

Both the first information source 202 and the second information source 203 include a list of potential recipients for the messages. For example, the information sources 202 and 203 could include information on recipients 60, 62, 64, and 66. The first information source 202 and the second information source 203 can be edited to add or remove recipient entries. For example, the information sources 202 and 203 could individually or jointly add information on a new recipient, John Doe, capable of receiving a notification. The first information source 202 and the second information source 203 are also configured to associate messages with recipients. For example, new recipient John Doe can be selected to receive the message "Main Street is closed due to emergency repair." The first information source 202 and the second information source 203 can associate a single message with a single recipient (e.g., recipient John Doe receives a single message in a notification), multiple messages with a single recipient (e.g., recipient John Doe receives multiple messages in a notification), or multiple messages with multiple recipients (e.g., both recipient John Doe and other recipients receives multiples messages in a notification). Associations between messages and recipients may be created using methods known to those with skill in the art, such as, for example, metadata tags. For example, as illustrated with respect to the first information source 202, a data structure indicative of an intended recipient 212, such as a data structure indicative of the recipient's telephone number, may be tagged with several tags 214, where each tag is indicative of a message.

In certain embodiments, the first information source 202 and second information source 203 may be located on the same network. In certain embodiments, the first information source 202 may be located on a first network and the second information source 203 may be located on a second network remote from the first network. For example, the first information source 202 may be local to CPU 26, such as a server located on the network of an administrative office of a city government, while the second information source 203 may be remote to CPU 26, and may be, for example, a server located on the network of a fire station for the city.

The transmission interface 206 and the transmission interface 25 are similar to the transmission interface 24, and may be, for example, an ordinary land telephone, a radio transmitter, a cell phone, a computer for sending email, a computer with an internet connection, a modem, a data communications device, or it may be a facsimile machine for sending faxes, or the like. The transmissions interface 206 is configured to receive a selection of at least one message for at least one recipient from at least one user, and is further advantageously configured to receive selections of multiple messages for multiple recipients from multiple users. For example, the transmissions interface 206 can receive, via transmissions interface 24, a selection of messages from the first user 22 for a first recipient, and can simultaneously receive, via transmissions interface 25, a selection of messages from the second user 23 for the first recipient.

The associations module 208 is configured to process (e.g., concatenate or combine) the messages, from multiple users and multiple sources, associated with recipients into notifications that include the messages for those recipients. For example, two messages from the first user 22 for a recipient 60 and a third message from the second user 23 for the recipient 60 may be processed by associations module 208 into a single notification 32 to be distributed to the recipient 60 at a selected time. Once the notification 32 is created, it is stored in the delivery interface 46 and later distributed, as discussed above. The associations module 208 is further configured to remove or not include duplicate messages that were selected for delivery to a recipient. For example, if a first user (e.g., a member of an administrative office of a city government) and a second user (e.g., an employee of the fire department for the city) from different sources independently select a message (e.g., "Main street is closed due to inclement weather conditions") to deliver to a recipient (e.g., a resident of the city), the associations module 208 will advantageously remove any duplicate occurrence of the message so that the recipient receives the message only once. The associations module 208 is configured to distinguish between removable duplicate messages and seemingly duplicate messages which should be kept. By way of another example, if a first user (e.g., a student's first period teacher) and a second user (e.g., the student's second period teacher) from the same source independently select a message (e.g., "The student is performing well in class") to deliver to a recipient (e.g., the student's parents), the associations module 208 will advantageously identify that the messages, although the same, are associated with different users and therefore should be kept so that the recipient receives both messages in a notification. Hence, removable duplicate messages will not be concatenated within the notification to the recipient, while other duplicate messages (e.g., messages from different users) will be concatenated within the notification to the recipient.

Figure 3:
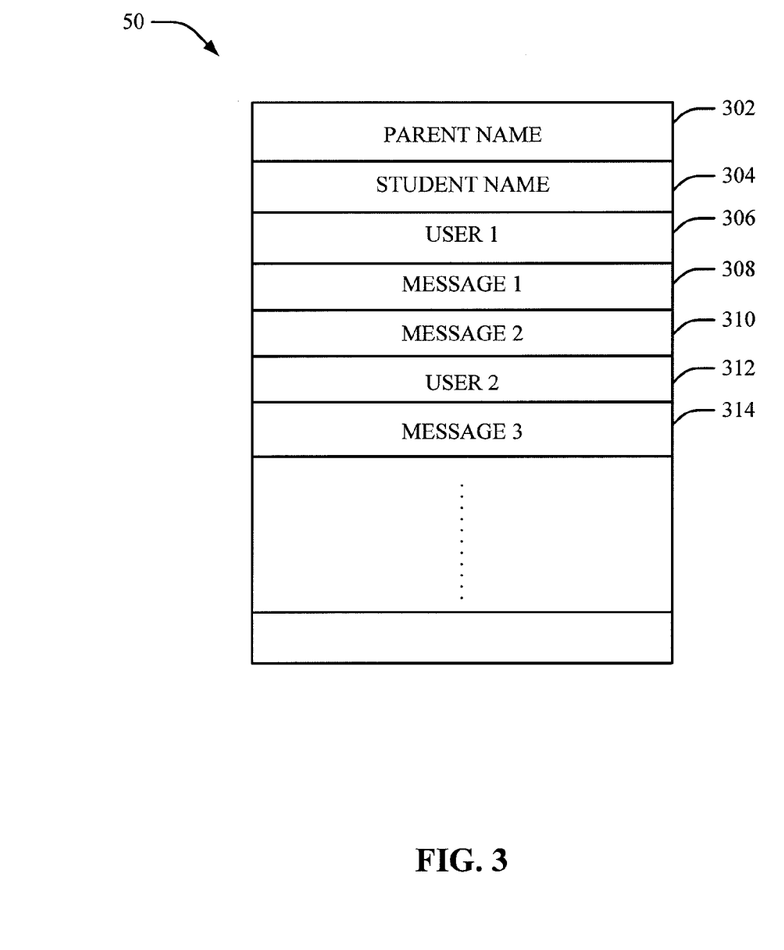
FIG. 3 is a diagram illustrating an example of notification data that can be stored within the CPU of FIG. 1.

FIG. 3 is a diagram illustrating an example of notification data that can be stored within CPU 26 of FIGS. 1-2. As noted above, CPU 26 (e.g., storage unit 48) may include notification data 50, sender data 52, and recipient data 54. In the example of FIG. 3, notification data 50 may correspond with student and/or parent recipients, with data fields including (but not limited to) "Parent Name" 302, "Student Name" 304, a field for a first user, "User 1" 306, fields for messages from the first user, "Message 1" 308 and "Message 2" 310, a field for a second user, "User 2" 312, fields for messages from the second user, "Message 3" 314, and so on. This data may be stored in text format, audio format, other media formats, or combinations thereof. Such configuration of data in CPU 26 may allow for the distribution of multiple messages from different sources (e.g., different users with different predetermined information sources) within the same notification data 50 of a single notification 32. For example, if several teachers want to send audio messages (e.g., via telephone, email attachment) of a student's performance in their classes, each teacher may include messages related to that student's performance as part of the notification data 50. An example of concatenating messages from multiple sources into a single notification is illustrated in FIG. 4.

Figure 4:
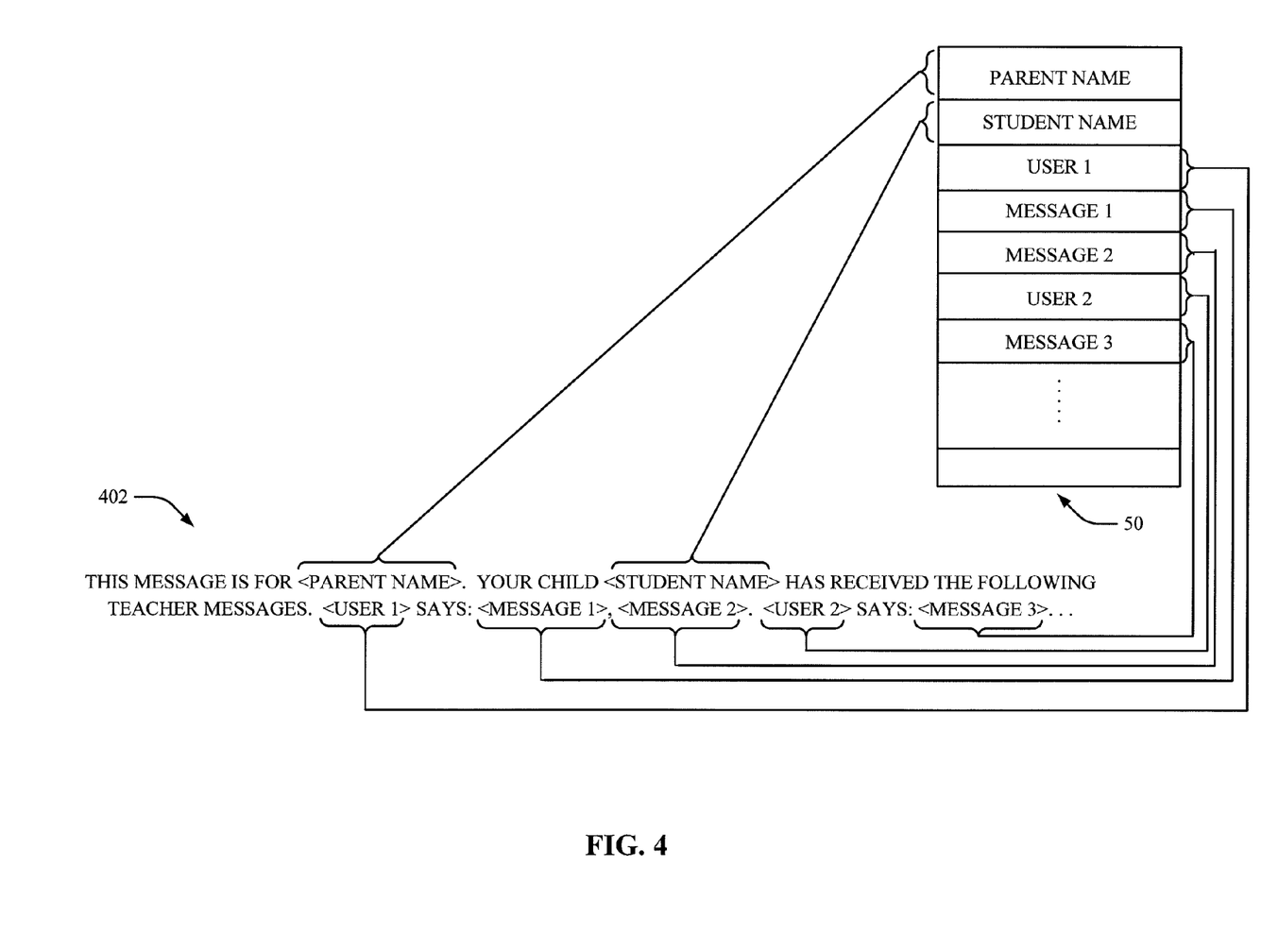
FIG. 4 is a diagram further illustrating the example notification data of FIG. 3.

FIG. 4 is a diagram illustrating an example of concatenating messages from multiple sources into a single notification. As described above with reference to FIG. 2, a first user 22 and a second user 23 may select messages from their respective information sources, first information source 202 and second information source 203, for distribution to a single recipient via their respective transmissions interfaces, transmissions interface 24 and transmissions interface 25. Although not illustrated, the first user 22 and the second user 23 may also select messages from the same information source for distribution. The selections of the first user 22 and the second user 23 are received by the associations module 208 through the transmissions interface 206 of the CPU 26. The associations module 208 can then process the selections to create notification data 50 that includes all of the messages from the first user 22 and the second user 23, which is then included in a single notification 32. In the example of FIG. 4, if the first user 306 is a first teacher, John Smith, at a school that has selected two messages, "participation has improved" 308 (message 1) and "discipline has improved greatly" 310 (message 2), to send to a parent 302, Jeff Doe, regarding the performance of his child, James Doe, in the first teacher's class at the school, and the second user 312 is a second teacher, Barbara Jones, at the school that has selected one message, "teamwork has improved" 314 (message 3), regarding the student's performance in the second teacher's class at the school, the associations module 208 can generate the following notification:

---

This notification is for Jeff Doe [<PARENT NAME, 302>]. Your child James Doe [<STUDENT NAME, 304>] has received the following teacher messages. John Smith [<USER 1, 306>] says: participation has improved [<MESSAGE 1, 308>], discipline has improved greatly [<MESSAGE 2, 310>]. Barbara Jones [<USER 2, 312>] says: teamwork has improved [<MESSAGE 3, 314>].

---

As can be seen in FIG. 4, a single notification distributed to a recipient (e.g., <PARENT NAME, 302>) can include multiple messages (e.g., <MESSAGE 1, 308>, <MESSAGE 2, 310>, and <MESSAGE 3, 314>) from multiple sources (e.g., <USER 1, 306> and <USER 2, 312>). The example of FIG. 4 relates to a school and parent environment, but the present disclosure is not limited to such environment, as the other examples demonstrate. The presently disclosed systems and methods may be used in many different environments.

Figure 5:
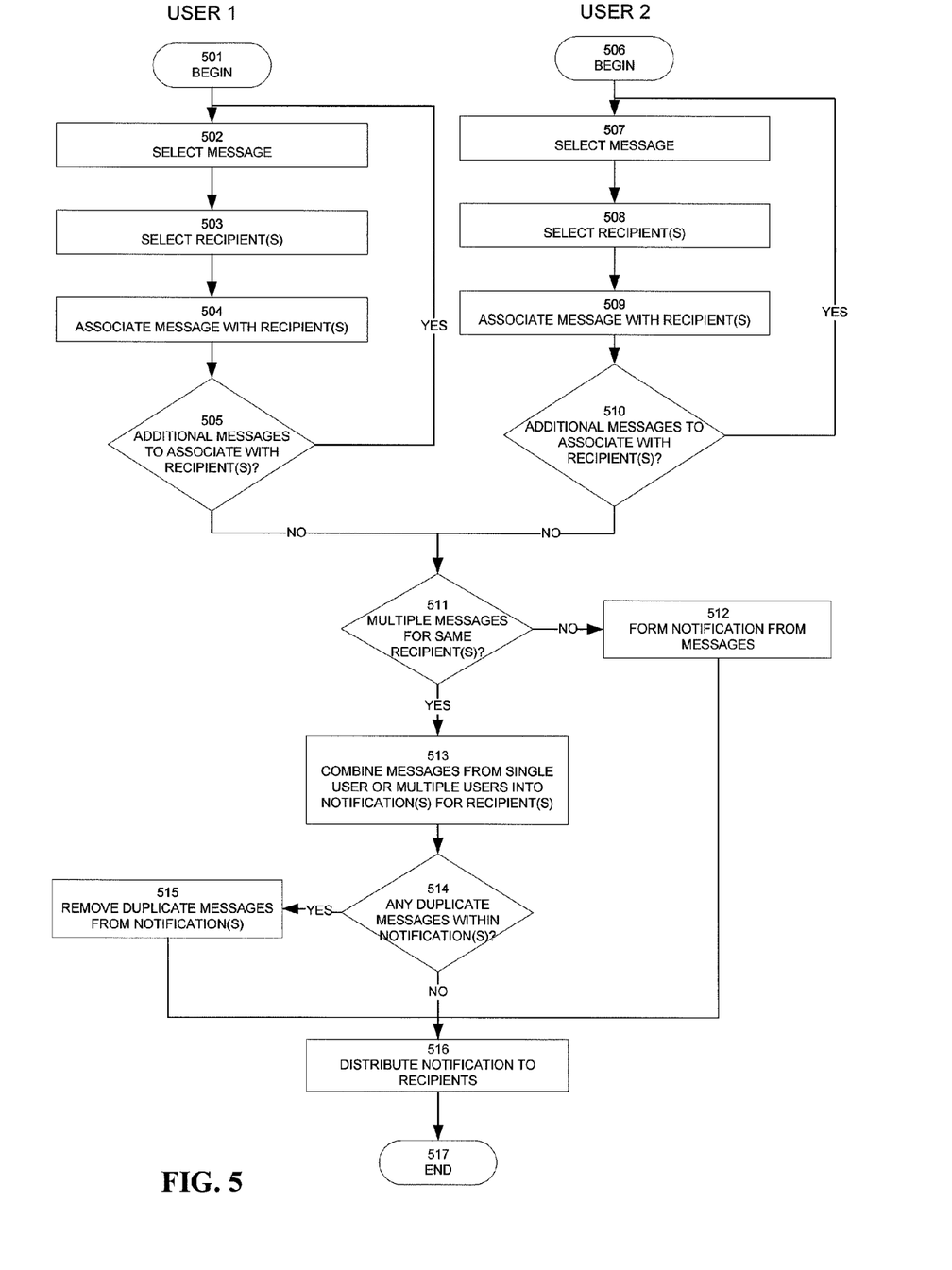
FIG. 5 is a flow chart illustrating an exemplary operation of combining multiple messages into a single notification.

Having set forth by example in FIG. 4 a process by which multiple messages from multiple sources are presented in a single notification, FIG. 5 shows this process in general form. More specifically, FIG. 5 is a flow chart illustrating an exemplary process of combining multiple messages into a single notification.

The process proceeds for a first user from beginning step 501 to step 502 in which a message is selected to send. Next, in step 503, either one or multiple recipients are selected to receive the message. In step 504, the message is associated with the selected recipient or recipients. Next, in decision step 505, if there are additional messages to associate with a recipient or recipients, the process returns to step 502. Otherwise, the process proceeds to decision step 511. A similar process occurs in steps 506 to 510 for another user. The other user may use the same information source as the first user or a different information source. Steps 506 to 510 may occur independently from steps 501 to 505 or may be dependent on steps 501 to 505. Steps 506 to 510 may occur in parallel to steps 501 to 505, or may occur either before or after steps 501 to 505. In certain embodiments, steps similar to steps 501 to 505 and steps 506 to 510 can be generated for other users in the process.

In decision step 511, if multiple messages have not been selected for the same recipient or recipients, the process moves to step 512 in which a single notification is created for each recipient, where each notification contains the single message selected for the recipient. If, however, in decision step 511, multiple messages have been selected for the same recipient, whether from a single user or multiple users, then in step 513 the selected messages are combined into a single notification for each of the selected recipients. In decision step 514, if there are no duplicate messages within a notification for a recipient, the process moves to step 516. If, however, there are duplicate messages within a notification for a recipient, then duplicate messages are removed from the notification in step 515. Notifications are then distributed in step 516 to each of the selected recipients. The process ends in step 517.

Having set forth in FIG. 5 a process by which multiple messages from multiple sources are presented in a single notification, an example will now be presented using the process of FIG. 5, where the first user is a representative from a city's police department (hereinafter "police representative") and the second user is a representative from the city's fire department (hereinafter "fire representative").

The process proceeds for the police representative from beginning step 501 to step 502 in which the police representative selects to send a message "Please remove parked cars from Main Street for snow plowing tomorrow." Next, in step 503, the police representative selects to send the message to Recipient 160 (from FIG. 2). In step 504, the message "Please remove parked cars from Main Street for snow plowing tomorrow," is associated with Recipient 160. Next, in decision step 505, the police representative decides to send another message to Recipient 160, so the process returns to step 502. In step 502, the police representative selects to send another message, "Snowfall will be bringing extreme cold; residents without heat in their homes should go to a shelter," and selects Recipient 160 in step 503 to receive the message. In step 504, the message "Snowfall will be bringing extreme cold; residents without heat in their homes should go to a shelter," is then also associated with Recipient 160. The police representative decides there are no additional messages to associate with any recipients in step 505.

Approximately contemporaneously in this example, the fire representative proceeds from beginning step 506 to step 507 in which the fire representative also selects to send a message "Snowfall will be bringing extreme cold; residents without heat in their homes should go to a shelter." Next, in step 503, the fire representative also selects to send the message to Recipient 160. In step 504, the message "Snowfall will be bringing extreme cold; residents without heat in their homes should go to a shelter," is associated with Recipient 160. Next, in decision step 505, the fire representative decides there are no additional messages to associate with any recipients in step 505, and the process moves to decision step 511. When both users have decided that there are no additional messages to associate with any recipients, the process moves to decision step 511.

In step 511, the process determines there are multiple messages (i.e., "Please remove parked cars from Main Street for snow plowing tomorrow," and "Snowfall will be bringing extreme cold; residents without heat in their homes should go to a shelter," from the police representative, and "Snowfall will be bringing extreme cold; residents without heat in their homes should go to a shelter," from the fire representative) for the same recipient, Recipient 160. Consequently, the process moves to step 513 in which the three messages from the two users for single recipient, Recipient 160, are combined into a single notification. In decision step 514, it is determined that the notification includes duplicate messages, the message "Snowfall will be bringing extreme cold; residents without heat in their homes should go to a shelter," from the both the police representative and fire representative. The process moves to step 515, in which the "Snowfall will be bringing extreme cold; residents without heat in their homes should go to a shelter," message from the police representative is removed. In certain other embodiments, the "Snowfall will be bringing extreme cold; residents without heat in their homes should go to a shelter," message from the fire representative is removed. Next, in step 516, a single notification containing the message "Please remove parked cars from Main Street for snow plowing tomorrow," from the police representative and the message "Snowfall will be bringing extreme cold; residents without heat in their homes should go to a shelter," from the fire representative is distributed to Recipient 1 60. The process then ends in step 517.

Figure 6:
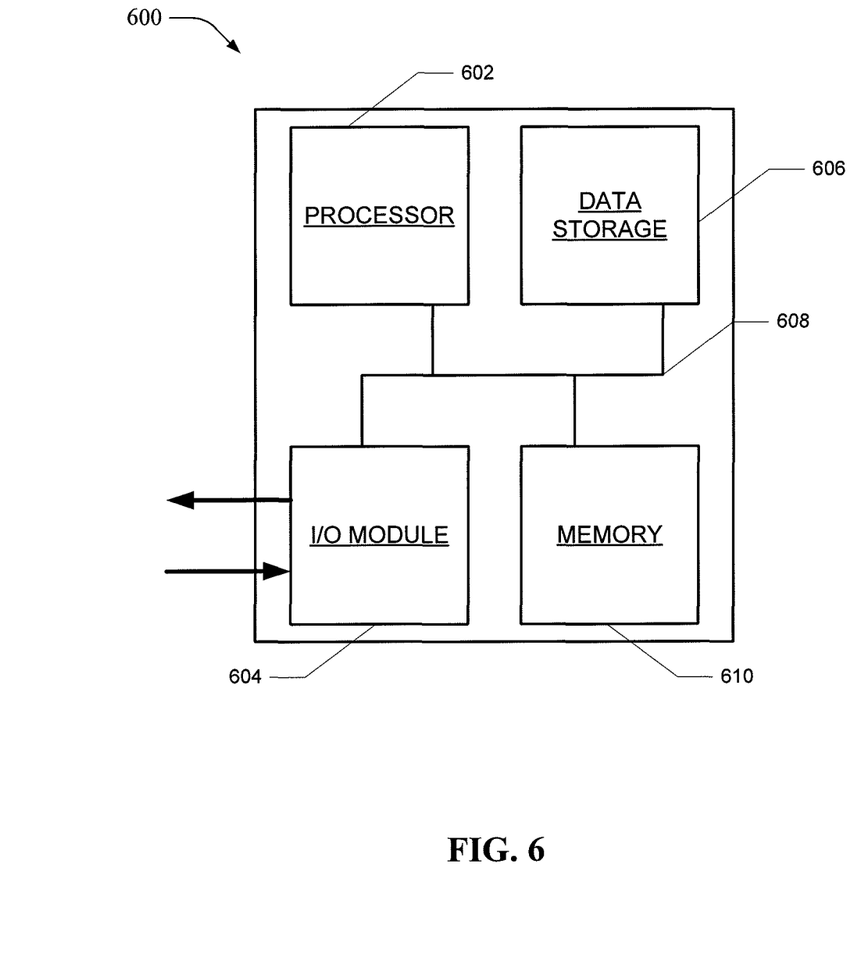
FIG. 6 is a block diagram illustrating an example of a computer system upon which multiple messages can be concatenated into a single notification.

FIG. 6 is a block diagram that illustrates a computer system 600 upon which an embodiment of the present disclosure may be implemented in accordance with one aspect of the present disclosure. Computer system 600 includes a bus 608 or other communication mechanism for communicating information, and a processor 602 coupled with bus 608 for processing information. Computer system 600 also includes a memory 610, such as a random access memory ("RAM") or other dynamic storage device, coupled to bus 608 for storing information and instructions to be executed by processor 602. Memory 610 may also be used for storing temporary variable or other intermediate information during execution of instructions to be executed by processor 602. Computer system 600 further includes a data storage device 606, such as a magnetic disk or optical disk, coupled to bus 608 for storing information and instructions.

Computer system 600 may be coupled via I/O module 604 to a display device, such as a cathode ray tube ("CRT") or liquid crystal display ("LCD") for displaying information to a computer user. An input device, such as, for example, a keyboard or a mouse may also be coupled to computer system 600 via I/O module 604 for communicating information and command selections to processor 602.

According to one aspect of the present disclosure, the transmission of notifications may be implemented using a computer system 600 in response to processor 602 executing one or more sequences of one or more instructions contained in memory 610. Such instructions may be read into memory 610 from another machine-readable medium, such as data storage device 606. Execution of the sequences of instructions contained in main memory 610 causes processor 602 to perform the process steps described herein. One or more processors in a multi-processing arrangement may also be employed to execute the sequences of instructions contained in memory 610. In alternative embodiments, hard-wired circuitry may be used in place of or in combination with software instructions to implement various embodiments of the present disclosure. Thus, embodiments of the present disclosure are not limited to any specific combination of hardware circuitry and software.

The term "machine-readable medium" as used herein refers to any medium that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 606. Transmission media include coaxial cables, copper wire, and fiber optics, including the wires that comprise bus 608. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Those of skill in the art would appreciate that the various illustrative blocks, modules, elements, components, methods, and algorithms described herein may be implemented as electronic hardware, computer software, or combinations of both. Furthermore, these may be partitioned differently than what is described. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A system for sending messages within notifications to a recipient, comprising:
   a processor; and
   a memory comprising:
   a recipient module configured to store information related to at least one recipient;
   a messaging module configured to store a plurality of stored messages;
   an association module configured to:
   receive a selection of a first stored message from the plurality of stored messages by a first sending person, and a selection of a second stored message from the plurality of stored messages by a second sending person, the second person being different than the first sending person, wherein each of the first stored message and the second stored message comprises an intended amount of content to be communicated by the first sending person and the second sending person; and
   associate, using the processor, the at least one recipient with the first stored message and the second stored message selected from the plurality of messages, and associate the first stored message and the second stored message together for at least one notification; and
   a transmission module configured to transmit the at least one notification to the at least one recipient, the at least one notification comprising the intended amount of content to be communicated by the first sending person and the second sending person, and additional content to be communicated to the at least one recipient that associates the content to be communicated to the at least one recipient,
   wherein the additional content comprises data fields that are replaced with identifications of the first sending person and the second sending person, and wherein the identifications of the first sending person and the second sending person are communicated to the at least one recipient in the notification.

2. The system of claim 1, wherein the messaging module is configured to obtain the plurality of stored messages from a plurality of information sources.

3. The system of claim 1, wherein the association module is configured to associate the at least one recipient with at least three stored messages from the plurality of stored messages, the at least three stored messages comprising a duplicate message, and wherein the association module is further configured to remove the duplicate message from the at least one notification.

4. The system of claim 1, wherein at least one of the plurality of stored messages is editable.

5. The system of claim 1, wherein the notification is in at least one of audio format or text format.

6. The system of claim 1, wherein the plurality of stored messages are in at least one of audio format or text format.

7. The system of claim 1, wherein the transmission module is configured to transmit the notification using at least one of electronic messaging, radio frequency communication, and telephone communication.

8. The system of claim 1, wherein all of the messages associated with the at least one recipient are provided in a single notification to the at least one recipient.

9. The system of claim 1, wherein the plurality of stored messages are stored in a plurality of messaging modules.

10. A method for sending messages within notifications to a recipient, comprising:
  receiving information related to at least one recipient;
  receiving a selection of a first stored message from a plurality of stored messages by a first sending person, and a selection of a second stored message from the plurality of stored messages by a second sending person, the second person being different than the first sending person, wherein each of the first stored message and the second stored message comprises an intended amount of content to be communicated by the first sending person and the second sending person;
  associating the at least one recipient with the first stored message and the second stored message selected from the plurality of stored at least two messages, and associate the first stored message and the second stored message together for at least one notification; and
  transmitting the at least one notification to the at least one recipient, the at least one notification comprising the intended amount of content to be communicated by the first sending person and the second sending person, and additional content to be communicated to the at least one recipient that associates the content to be communicated to the at least one recipient,
  wherein the additional content comprises data fields that are replaced with identifications of the first sending person and the second sending person, and wherein the identifications of the first sending person and the second sending person are communicated to the at least one recipient in the notification.

11. The method of claim 10, wherein the plurality of stored messages are received from a plurality of information sources.

12. The method of claim 10, further comprising:
  associating the at least one recipient with at least three stored messages from the plurality of stored messages, the at least three stored messages comprising a duplicate message; and
  removing the duplicate message from the at least one notification.

13. The method of claim 10, wherein at least one of the plurality of messages is editable.

14. The method of claim 10, wherein the notification is in at least one of audio format or text format.

15. The method of claim 10, wherein the plurality of stored messages are in at least one of audio format or text format.

16. The method of claim 10, wherein the at least one notification is transmitted using at least one of electronic messaging, radio frequency communication, and telephone communication.

17. The method of claim 10, wherein all of the messages associated with the at least one recipient are provided in a single notification to the at least one recipient.

18. A non-transitory machine-readable medium encoded with instructions for sending messages within notifications to a recipient, the instructions comprising code for:
  receiving information related to at least one recipient;
  receiving a selection of a first stored message from a plurality of stored messages by a first sending person, and a selection of a second stored message from the plurality of stored messages by a second sending person, the second person being different than the first sending person, wherein each of the first stored message and the second stored message comprises an intended amount of content to be communicated by the first sending person and the second sending person;
  associating the at least one recipient with the first stored message and the second stored message selected from the plurality of stored at least two messages, and associate the first stored message and the second stored message together for at least one notification; and
  transmitting the at least one notification to the at least one recipient, the at least one notification comprising the intended amount of content to be communicated by the first sending person and the second sending person, and additional content to be communicated to the at least one recipient that associates the content to be communicated to the at least one recipient,
  wherein the additional content comprises data fields that are replaced with identifications of the first sending person and the second sending person, and wherein the identifications of the first sending person and the second sending person are communicated to the at least one recipient in the notification.

19. A system for sending messages within notifications to a recipient, comprising:
  means for receiving information related to at least one recipient, and for receiving a selection of a first stored message from a plurality of stored messages by a first sending person, and a selection of a second stored message from the plurality of stored messages by a second sending person, the second person being different than the first sending person, wherein each of the first stored message and the second stored message comprises an intended amount of content to be communicated by the first sending person and the second sending person; and
  means for associating the at least one recipient with the first stored message and the second stored message selected from the plurality of stored messages, and associate the first stored message and the second stored message together for at least one notification,
  wherein the means for receiving is further configured for transmitting the at least one notification to the at least one recipient, the at least one notification comprising the intended amount of content to be communicated by the first sending person and the second sending person, and additional content to be communicated to the at least one recipient that associates the content to be communicated to the at least one recipient,
  wherein the additional content comprises data fields that are replaced with identifications of the first sending person and the second sending person, and wherein the identifications of the first sending person and the second sending person are communicated to the at least one recipient in the notification.

20. The system of claim 1, wherein the association module is configured to generate the at least one notification using a pre-defined template.

21. The system of claim 20, wherein the association module wherein the pre-defined template comprises at least one of a pre-defined order of the plurality of stored messages, and the additional content to include in the at least one notification.

22. The system of claim 21, wherein the additional content further comprises a second data field that is replaced with an identification of the at least one recipient, and wherein the identification of the at least one recipient is communicated to the at least one recipient in the notification.

* * * * *